Dec. 3, 1968 J. H. THORP 3,413,669
MECHANISM FOR CONVEYING UNBOUND BOOKS INTERMITTENTLY
THROUGH A ROUNDING AND BACKING MACHINE
Filed Feb. 1, 1967 5 Sheets-Sheet 1
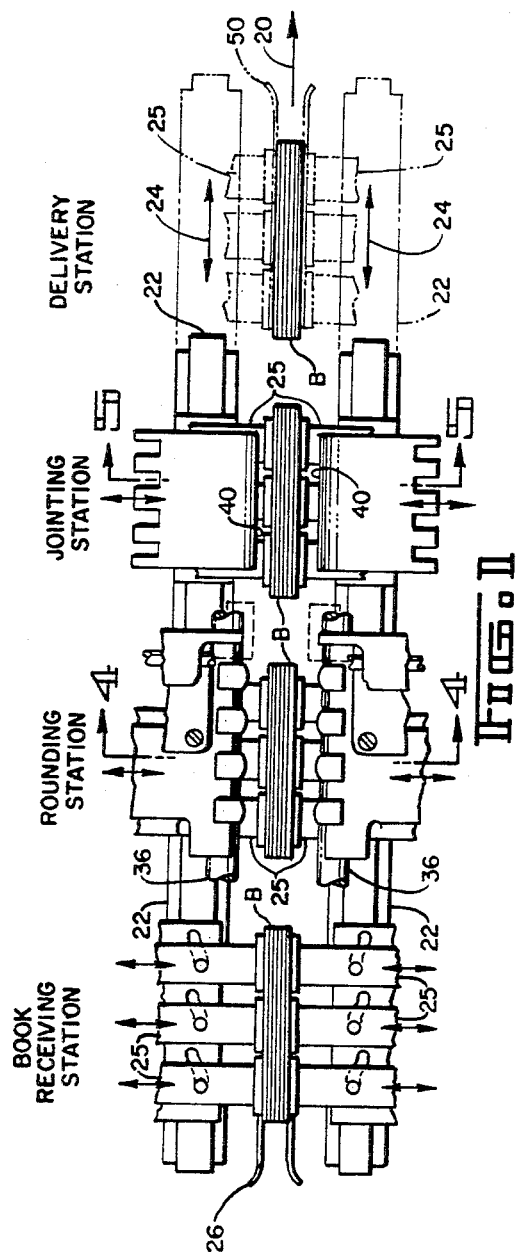
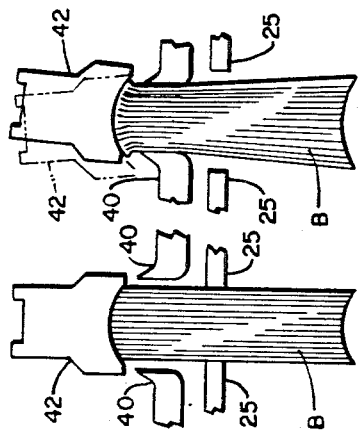
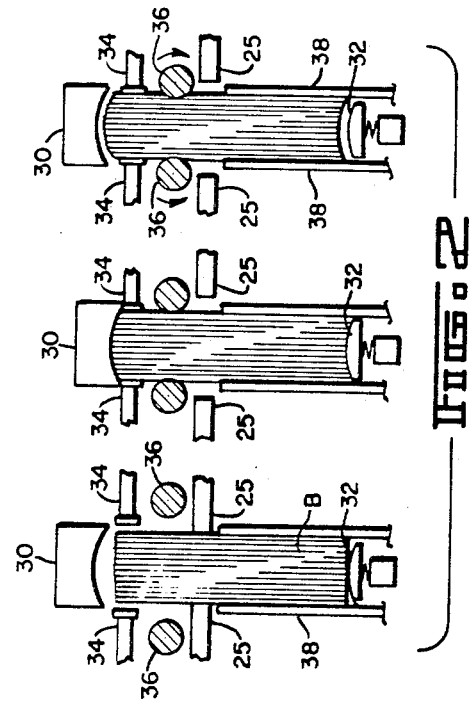
INVENTOR.
JAMES H. THORP
BY
McConnell, Paulding & Huber
ATTORNEYS.

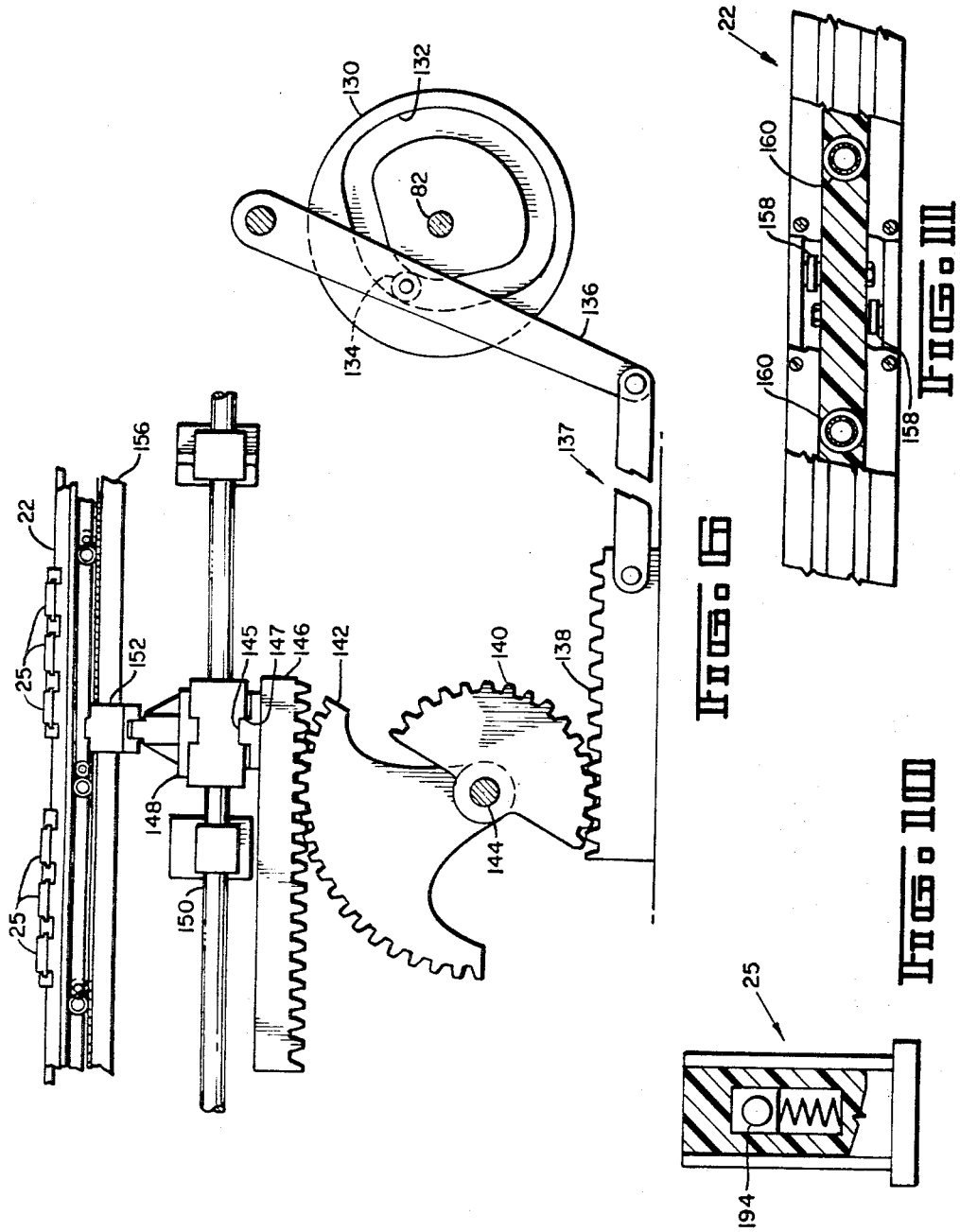

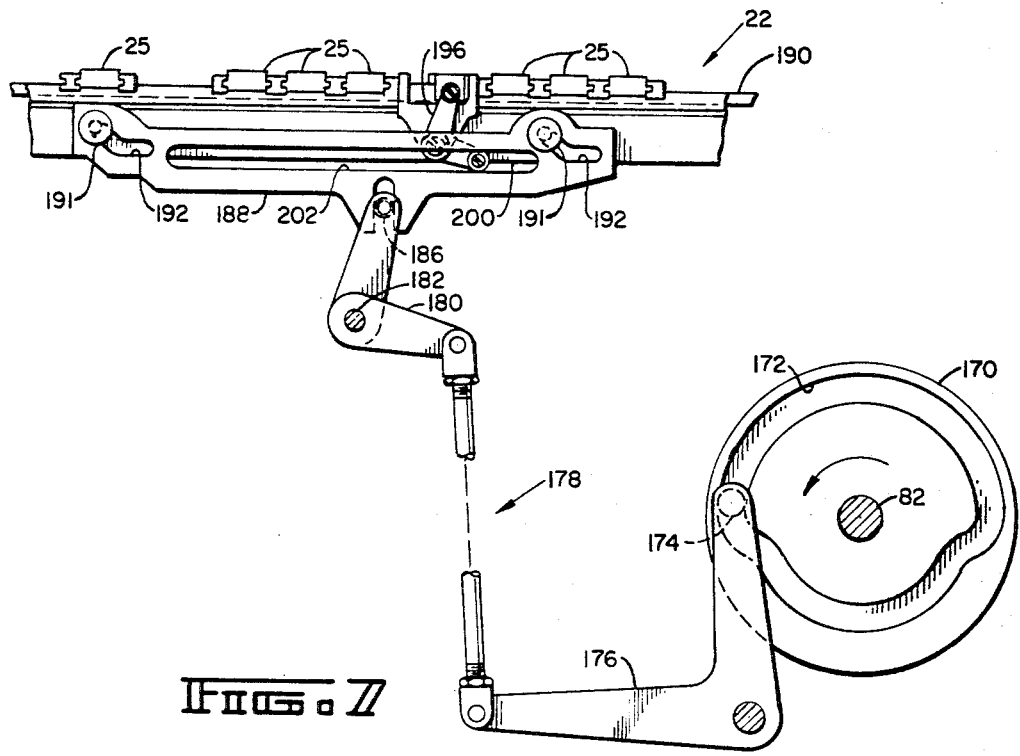
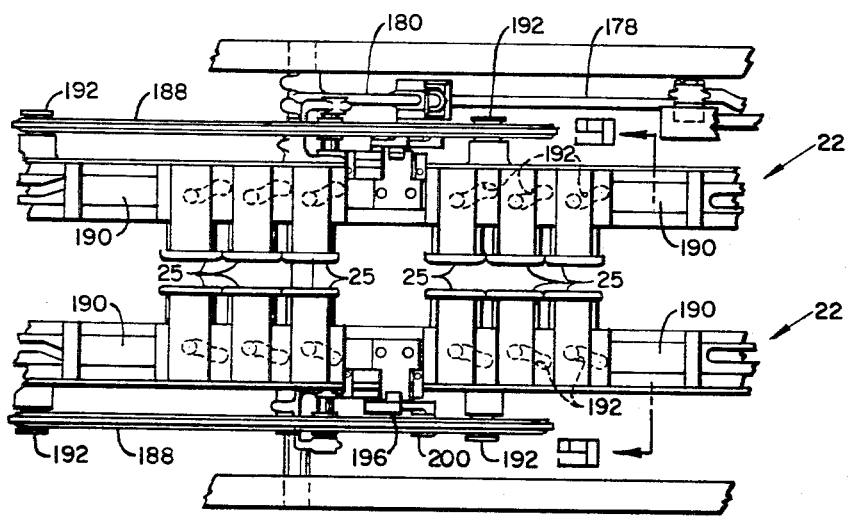

United States Patent Office 3,413,669
Patented Dec. 3, 1968

3,413,669
MECHANISM FOR CONVEYING UNBOUND BOOKS INTERMITTENTLY THROUGH A ROUNDING AND BACKING MACHINE
James H. Thorp, West Hartford, Conn., assignor to The Smyth Manufacturing Company, Bloomfield, Conn., a corporation of Connecticut
Filed Feb. 1, 1967, Ser. No. 613,211
6 Claims. (Cl. 11—5)

ABSTRACT OF THE DISCLOSURE

A light weight book conveying mechanism having parallel carrier rails which reciprocate longitudinally in timed relation with the operation of book forming means at various machine stations, which rails carry light weight book engageable jaws movable toward and away from one another to grip the books during movement of said rails in one direction, and which jaws release said books for shaping by said forming means during retrograde movement; said mechanism residing in a rounding and backing machine having cams which operate said book conveying mechanism, and said book forming means cyclically to advance said books from one station to the next and to form said books at one of said stations during each cycle with no more than one third of each machine cycle being taken up by movement of said books from station to station.

Background of invention

This invention relates to machines for rounding and shaping the backs of unbound books, and deals more particularly with a light weight mechanism for conveying the books in an intermittent fashion through the machine with a predetermined dwell period at each of the various book forming stations.

Prior art machines for rounding and shaping the backs of unbound books are disclosed in Patents Nos. 1,802,355 and Re. 18,920 issued to Schramm. The book jointing means and the means for initially rounding the book respectively disclosed in these patents are essentially the same as those disclosed herein. However, the mechanism for conveying the books through such a machine has been revised and improved in order to enhance the book handling capacity of the machine per unit time. The mechanism for conveying the unbound books bears some similarity to the mechanism disclosed in Schramm Patent No. 2,151,991 wherein parallel carrier rails reciprocate longitudinally, and have jaws for engaging bound books to advance said bound books to creasing stations where the books are held stationary for predetermined dwell periods to permit creaser jaws to form the joint area of the book covers or cases. The novelty in the present application does not reside in substituting the book conveying mechanism disclosed in the last-mentioned Schramm patent for that shown in the earlier rounding and backing machine patents, but rather in improving this basic conveying mechanism so that unusual results are achieved in the basic book rounding machine as a result of redesigning the timing means or cams used to operate said conveying mechanism and said book forming means.

Summary of invention

The combination described and claimed herein includes a light weight mechanism for conveying unbound books through successive book forming stations in a book rounding and backing machine, said mechanism being so designed that the books are moved at relatively high speed, but which mechanism also allows sufficient dwell time at each machine station for the conventional rounding and backing mechanisms to act upon the books.

The general object of the present invention is to provide a book conveying mechanism for a rounding and backing machine, which mechanism is so designed that the efficiency of the overall machine, as measured by the ratio of time spent in moving from one station to another as compared to the time spent at a particular station is greatly improved over that attainable with prior art book rounding and backing machines.

A more specific object of the present invention is to provide a book conveying mechanism of the foregoing character wherein a very light-weight material is used in fabricating a substantial portion of the movable parts thereof, so that the lineal speed at which books are conveyed from station to station in the overall machine can be substantially increased over that possible with prior art mechanisms, with no net increase in the inertial loads required to be reacted by the machine frame, and with no increase in the forces required to drive said movable parts at the increased speeds.

Brief description of the drawings

FIG. 1 is a plan view of the basic components of a rounding and backing machine, with the various drive means for operating said components being omitted for clarity.

FIG. 2 is a series of views showing how the unbound book is formed at the rounding station of FIG. 1.

FIG. 3 is a series of views showing how the unbound book is formed at the jointing station of FIG. 1, the jointing iron being shown at the limits of its travel in broken and solid lines.

FIG. 6 is an elevational view showing one side of one of the two book carrier rails shown in FIG. 1, together with the drive means for reciprocating the rail longitudinally.

FIG. 7 is an elevation of the opposite side of one of said carrier rails showing the drive means for moving the jaws toward and away from the corresponding jaws in the other rail.

FIG. 8 is a plan view of both carrier rails showing the mechanism of FIG. 7, and including the means for interconnecting the jaws in both rails for movement toward and away from one another.

FIG. 10 is a plan view of one nylon book engageable jaw, with a portion broken away to reveal the cam follower pin slidably mounted therewithin.

FIG. 11 is a plan view of one nylon carrier rail, with a portion broken away to reveal the guide rollers mounted thereon.

Detailed description

Figure 4:
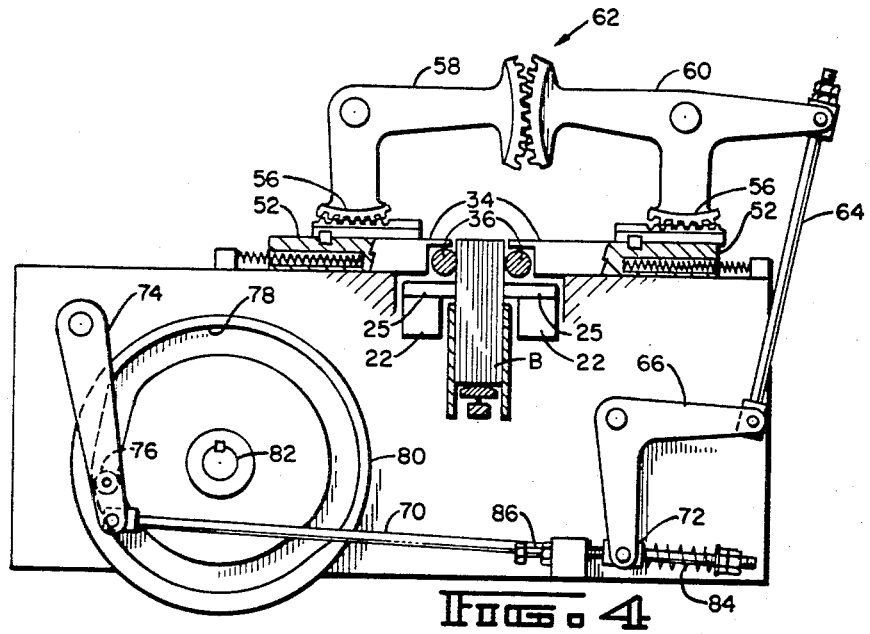
FIG. 4 is a vertical sectional view through the rounding station, being taken on the line 4—4 of FIG. 1.

Turning now to the drawings in greater detail, FIG. 1 shows in schematic form the path of movement of an unbound book through a rounding and backing machine incorporating a book conveying mechanism of the present invention. The unbound books are moved intermittently from left to right through the machine in the direction of the arrow 20 from the book receiving station to the book delivery station as shown. Longitudinally extending carrier rails 22, 22 are slidably supported in the fixed frame of the machine (not shown) for reciprocatory motion in the direction of the arrows 24, 24 between the positions shown in full and broken lines. Each of the carrier rails 22 carries three sets of book engageable jaws 25, 25, which jaws are movable laterally toward and away from corresponding jaws in the other of said carrier rails by suitable means to be described. All of these jaws move in timed relationship with reciprocatory motion of the carrier rails to advance the books from station to station in the machine.

More particularly, an unbound book (B) is placed in position at the receiving station by any suitable means, as for example by manually placing the book between the guide rails 26, 26 on a horizontally extending guide bar (not shown) and the machine is placed in operation so that the jaws 25, 25 move toward one another to grip the book (B), and the carrier rails 22, 22 then move from the solid line position shown to the broken line position of FIG. 1 to advance the book from the receiving station to the rounding station. The rounding station includes a tamping iron 30, best shown in FIG. 2, which moves downwardly onto the upwardly facing back of the unbound book so as to impart to the book an initial rounding as a result of the convex guide bar 32. The convex guide bar 32 is preferably spring biased upwardly as shown. Still with reference to FIG. 2, it will be seen that the carrier rail jaws 25, 25 next move outwardly away from the book, and that spring biased righting blocks 34, 34 simultaneously move inwardly toward the book, as do driven rollers 36, 36 in order to hold the book (B) between the guide plates 38, 38 as the jaws 25, 25 are retracted. As shown in the last view of FIG. 2, the tamping iron 30 is raised slightly and the driven rollers 36, 36 rotated in the direction indicated so as to slide the grouped pages of the book relative to one another with the intermediate pages being given a slightly greater vertical displacement so as to further increase the radius of curvature of the back of the unbound book (B). Finally, a second set of carrier jaws 25, 25 move inwardly to engage the rounded book at the rounding station, and the righting blocks 34, 34 together with the rounding rollers 36, 36 are retracted, so that the book can be advanced to the next succeeding station in the machine. It will, of course, be apparent that the jaws 25, 25 which initially engage the book at the receiving station and carry the same to the rounding station are returned with the carrier rails to the book receiving station as the righting blocks 34, 34 and rollers 36, 36 operate on the book at said rounding station. In one complete cycle of operation of the machine then, the book (B) is advanced from one station to another and is shaped by suitable forming means as for example the tamping iron 30 and rollers 36, 36 at the rounding station just described.

FIG. 4 shows in detail the mechanism for moving the righting blocks 34, 34 and rounding rollers 36, 36 toward and away from one another in timed relationship with other components of the machine. Suitable means is also provided for driving the rollers 36, 36 in the direction of the arrows in FIG. 2. Said last-mentioned means is adequately shown and described in the above-mentioned patent to Schramm, Re. 18,920, and will not be described herein.

During each machine cycle a second book (B) at the rounding station will be advanced to the jointing station indicated schematically in FIG. 1. The book shaping, or forming means, provided at the jointing station will also act upon such a book during a portion of such machine cycle. The intermediate sets of jaws 25, 25 serve to advance books from the rounding station to the jointing station in a manner similar to that described hereinabove with reference to the jaws 25, 25 for moving the book from the receiving station to the rounding station. Referring now to FIG. 3, the intermediate sets of jaws 25, 25 are shown in the left-hand portion of that view in engagement with the book (B), and in the right-hand portion withdrawn in position for retrograde movement to the rounding station. As the jaws 25, 25 are retracted, clamp jaws 40, 40 move inwardly toward one another, as shown in FIG. 3, and a jointing iron 42 is provided in engagement with the convex back edge of the book as shown. Means is provided, as shown in detail in FIG. 5, for oscillating the jointing iron 42 between the positions shown in broken and full lines in FIG. 3 in order to buckle slightly the backs of each of the group of signatures in the unbound book. Patent No. 1,802,355, issued to Schramm, shows and describes in greater detail the mechanism for clamping the unbound book (B) at the jointing station, and for oscillation of the jointing iron 42. It will, of course, be apparent that the intermediate sets of jaws 25, 25 are returned by retrograde movement to the rounding station simultaneously with operation of the jointing iron 42 just described.

Still with reference to FIG. 1, a book (B) at the jointing station is simultaneously moved to the delivery station by a third set of jaws 25, 25 during the same cycle of operation of the rounding and backing machine. Guide plates 50, 50 are provided to hold a book at said delivery station as the jaws 25, 25 are retracted to the broken line position.

The conventional mechanism for operation of the rounding rolls 36, 36 and righting blocks 34, 34 will now be described briefly with reference to FIG. 4. The book conveying mechanism mentioned briefly hereinabove is shown schematically in FIG. 4 with a book (B) held between the jaws 25, 25, which jaws are carried by the rails 22, 22. Horizontally movable slides 52, 52 carry the righting blocks 34, 34 and rounding rolls 36, 36 at their inner ends as shown, and rack gears 54, 54 are attached to the tops of the slides for engagement with curved rack gears 56, 56 defined at the lower ends of the levers 58 and 60. The inner ends of these levers are provided with intermeshing curved rack gears, as indicated at 62, so that the slides 52, 52 will be operated synchronously. The lever 60 has an outwardly extending arm that is connected, by a rod 64, with the upper end of a bell crank 66. The bell crank 66 is pivotally supported in the fixed frame of the machine as shown and a depending arm 68, of the bell crank 66, is connected to one end of a rod 70 through a collar 72 which slidably receives the rod 70. The opposite end of the rod 70 is pivotally connected to a depending follower arm 74 which carries a cam follower 76 which travels in a cam groove 78 in the disc 80 on the camshaft 82. A spring 84 acts between the collar 72 and the extreme right hand end of the rod 70 so as to urge the collar 72 against the stop 86 and to hold the slides 52, 52 in an initial position wherein they are spaced slightly from the sides of a book to be shaped or formed. Upon rotation of the main crank shaft 82, the rounding rollers and righting blocks move into and out of engagement with the book (B) as described hereinabove with reference to FIG. 2.

Figure 5:
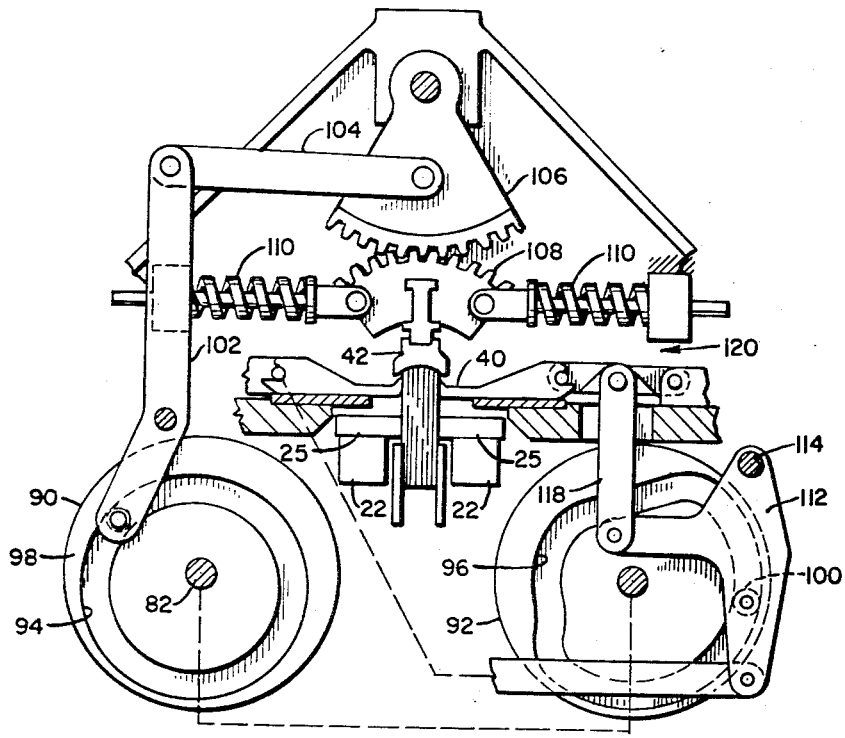
FIG. 5 is a vertical sectional view through the jointing station, being taken on the line 5—5 of FIG. 1.

The conventional mechanism for rocking the jointing iron 32 and for clamping the book at the jointing station is shown in FIG. 5. From that view it will be seen that the camshaft 82 carries cam discs 90 and 92 which define grooves 94 and 96 respectively for operation of the jointing iron 42 and clamp jaws 40, 40, respectively. The cam follower 98 is rotatably supported at one end of the vertically disposed arm 102, which arm is pivotally supported intermediate its ends in the fixed frame of the machine. The upper end of the arm 102 carries a cross link 104 which oscillates a gear segment 106 as shown in a back and forth motion in response to continuous rotation of the shaft 82. A gear segment 108 meshes with the oscillating gear segment 106 and carries the jointing iron 42 so that the latter can be oscillated between the broken and full line positions shown in FIG. 3 upon rotation of the crank shaft 82. Cushioning springs 110, 110 act between the fixed frame of the machine and the last-mentioned gear segment 108 as shown. A cam follower 100 is carried on a depending arm of a bell crank 112 which is pivotally supported in the fixed frame of the machine as shown at 114, and a horizontally extending arm 116 of the bell crank 112 carries a vertical link 118 which is connected to the knee portion of a toggle joint indicated generally at 120. One toggle link carries the clamp jaw 40 and the other toggle link is pivotally supported in the machine frame as shown. As so constructed up and down movement of the link 118, in response to tracking movement of the cam follower 100, causes the toggle joint 120 to move the clamp jaw 40 into and out of engagement with a book (B) to successively clamp the book and release the book at the jointing station. Once the clamp jaws 40, 40 are set, the jaws 25, 25 can be retracted and returned to the rounding station for advancing another book to the jointing station during a succeeding cycle of the machine. The clamp jaws 40, 40 also function in cooperation with the jointing iron 42 to buckle the back of the various signature pages as shown in FIG. 3.

Figure 9:
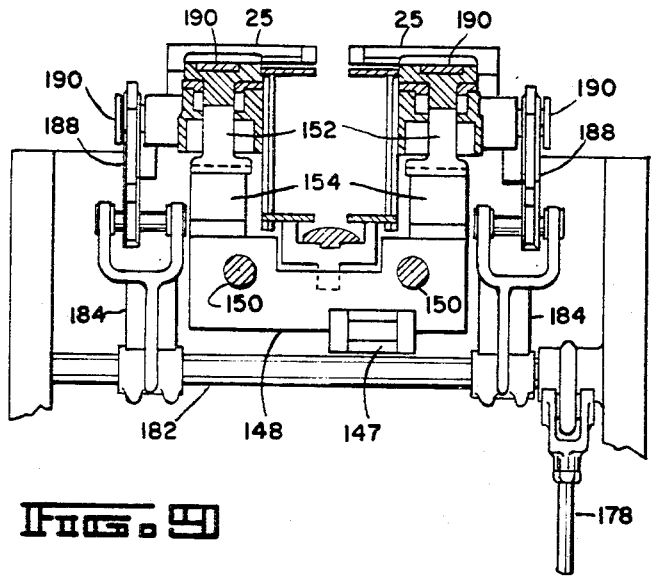
FIG. 9 is a vertical sectional view through both carrier rails, being taken on the line 9—9 of FIG. 8.

FIG. 6 is a somewhat schematic view of the mechanism for reciprocating the carrier rails 22, 22 of FIG. 1. From FIG. 6 it will be seen that the same camshaft 82 used to drive the cam discs associated with the rounding and jointing mechanisms also drives a cam disc 130 having a groove 132 in which a cam follower 134 is received. The cam follower 134 is carried intermediate the pivoted and free ends of a depending arm 136 as shown. The lower or free end of the arm 136 is connected to one end of a rack gear 138 through a suitable linkage indicated schematically at 137. A gear segment 140 is oscillated in response to reciprocatory motion of the rack 138 and a somewhat larger gear segment 142 is carried by the same shaft 144 as shown. A slightly longer rack 146 is slidably supported in the machine frame and carries a block 148 which extends laterally across and beneath the path of movement of the books through the machine, being slidably supported on guide rods 150, 150 generally beneath the carrier rails 22, 22 as best shown in FIG. 9. Each of the carrier rails 22, 22 carries a depending block 152 which defines a downwardly open socket in which an upstanding post portion 154 of the block 148 is received as shown. Each of the carrier rails 22, 22 is slidably supported in the fixed portion of the machine frame 156 by roller elements 158, 158 rotatably carried by the rail 22 as best shown in FIG. 11. Each carrier rail 22 is additionally supported against lateral movement in the machine frame by additional rollers 160, 160. As so constructed it will be apparent that reciprocatory motion of the carrier rails 22, 22 can be accomplished in timed relationship with the above-described mechanisms for moving the rounding rollers and the jointing iron and their associated blocks 34, 34 and jaws 40, 40 respectively.

FIGS. 7, 8, and 9 show in some detail the mechanism for moving the various sets of jaws 25, 25 toward and away from one another in response to rotation of the camshaft 82. A cam disc 170 is provided with a cam slot 172 in which a cam follower 174 is received as shown in FIG. 7. The cam follower 174 is carried at one end of a bell crank 176 to which a system of push rods, indicated schematically at 178, is connected for oscillation of a horizontal crank arm 180 on a rock shaft 182 rotatably supported in the machine frame. A vertical crank arm 184 on the rock shaft 182 carries a roller 186 which is received in a downwardly open socket defined in a bar 188. Two such bars 188, 188 are provided outboard of each of the carrier rails 22, 22 as best shown in FIG. 8, and each bar is supported adjacent its ends on fixed pins 191, 191. The bars 188, 188 have cam slots 192, 192 through which the pins 191, 191 extend so that rotation of the camshaft 82 causes raising and lowering of the bars 188, 188 in timed relationship with other components of the machine.

Still with reference to FIG. 8, each of the carrier rails 22, 22 includes an elongated cam plate 190 which extends longitudinally of its associated rail and defines a plurality of cam slots 192, 192 each of which receives a depending post 194 carried by one of the jaws 25, 25. Each cam plate 190 is slidably received in its associated rail 22 so that reciprocatory movement of the elongated cam plates 190, 190 causes simultaneous movement of each of the sets of jaws 25, 25 toward and away from the corresponding jaws in the other rail. Means is provided for transmitting the up and down movement of the bars 188, 188 to such reciprocatory motion of the elongated cam plates 190, 190, and as best shown in FIG. 7, said means comprises a bell crank 196 pivotally carried in a bracket 198 which moves with an associated carrier rail 22. Each bell crank 196 includes one arm which is connected to the cam plate 190, and a second arm which carries a roller 200 which rides in an elongated slot 202 defined in the bar 188. It will thus be seen that up and down movement of the bar 188 causes rotation of the bell crank 196 which bell crank in turn causes sliding movement of the cam plate 190 with respect to its associated carrier rail 22.

FIG. 9 shows in vertical section a portion of the mechanism for moving the jaws 25, 25 toward and away from one another. This view also shows a portion of the slide block 148 which rides on the guide bars 150, 150. Also shown in FIG. 9 is the downwardly open socket 147 for receiving a cooperatively shaped rib 145 on the rack gear 136 for imparting longitudinal movement to the carrier rails 22, 22. It will be seen from FIG. 9 that the socket defining portion 147 of the slide block 148 as well as the upstanding posts 154, 154 which are received in the blocks 152, 152 all move longitudinally with respect to the machine frame, as do the carrier rails 22, 22, including their associated cam plates 190, 190.

Figure 13:
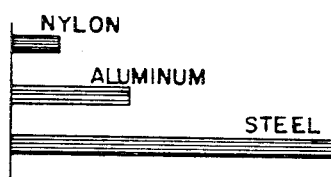
FIG. 13 is a graphical representation of the relative specific weights of nylon, aluminum and steel.

All of the above parts; namely the carrier rails 22, 22; the jaws 25, 25; and the slide block 148; with the exception of the ball bearing type rollers mentioned hereinabove at 158 and 160; are preferably made of a light weight plastic material having a specific gravity of less than two. Preferably the material adopted for these various parts is nylon which has a specific gravity of approximately 1.14. By way of comparison from FIG. 13 the specific gravities of aluminum and steel are also set forth showing the order of magnitude gained by adoption of nylon for these various parts. For example, aluminum can be seen to have a specific gravity of approximately 2.7 and steel a specific gravity of approximately 7.87.

Figure 12:
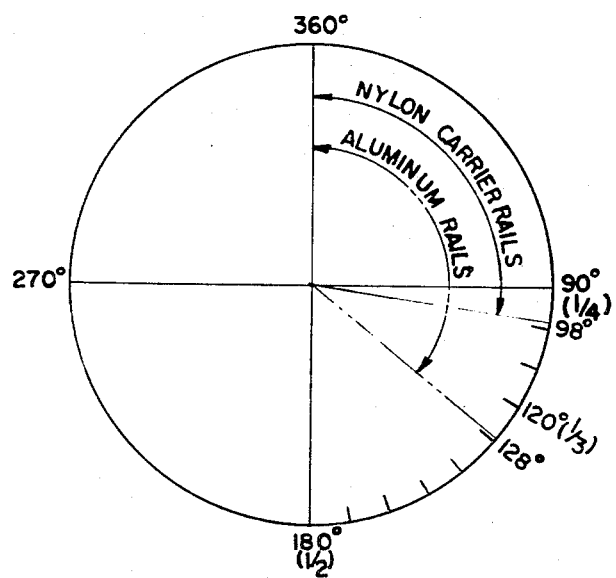
FIG. 12 is a schematic view showing a circle which represents one machine cycle, the broken line at approximately 128° representing the fractional port of 360° heretofore required for advancing a book from one station to another. The solid line at approximately 98° represents the fractional part of 360° now required for advancing a book from one station to another. Additional reference lines are depicted at 90°, 120°, 180° and 270° to illustrate fractional parts of one machine cycle corresponding to ¼, ⅓, ½, and ¾ respectively.

As a direct result of using nylon for the various parts mentioned immediately above, it has been found that the number of books to be shaped or formed in the above-described machine per unit time can be vastly increased. This result is accomplished with little or no sacrifice to the time required at the rounding and jointing stations by devoting a minimum portion of each machine cycle to the advancing of the unbound books from station to station in the machine. More particularly, and with reference to FIG. 12 it has been found that with aluminum carrier rails approximately 129° of each 360° cycle is required for advancing the unbound books. In contrast to this, it has been found that the use of nylon carrier rails permits the machine to be operated at higher speeds with only slightly over ¼ of each cycle being devoted to advancing the unbound books from station to station through the machine. More particularly, in the embodiment described herein approximately 98° of each 360° machine cycle is devoted to advancing the unbound books.

Thus, the apparatus disclosed herein represents a significant advance over prior art rounding and backing machines by providing a machine in which the books are advanced from station to station during less than one third of each machine cycle, whereby more than two thirds of each such cycle is available for shaping the unbound books.

The invention claimed is:

1. In a machine for shaping the backs of books at successive stations the combination comprising mechanism for advancing the books seriatim along a predetermined path in said machine, said mechanism including a portion which moves forwardly with the book being advanced, book shaping means at certain of said stations, timing means for synchronizing movement of said book advancing mechanism with that of said book shaping means so that each book is both advanced from one station to the next succeeding station and is acted upon by said shaping means during a typical machine cycle, said timing means serving to advance said books during less than one-third of each machine cycle, and said movable portion of said book advancing mechanism being made in substantial part from a light weight material having a specific gravity no greater than 2.0 in order to permit operation of said machine at relatively high speeds without exceeding the structural capability of the machine frame to react the inertial loads encountered during said forward movement of said book advancing mechanism.

2. The combination of claim 1 wherein said movable portion of said book advancing mechanism comprises a pair of side-by-side carrier rails slidably received in said machine frame for movement along said predetermined book path, book engageable jaws reciprocably held in each of said carrier rails for movement toward and away from a book to be advanced, and means responsive to said timing means for advancing said carrier rails to feed said books from one station to the next succeeding station, said jaws also being operable in timed relation to said carrier movement so as to move out of engagement with an advanced book to permit return movement of said carrier rails during the remaining two-thirds of said machine cycle.

3. The combination of claim 2 wherein said carrier rails are made of nylon and are slidably received on steel rollers which are rotatably supported in said nylon carrier rails, each of said book engageable jaws being made of nylon and being slidably received in one of said nylon rails, a nylon cam plate extending substantially the entire length of each rail and having cam slots associated with each nylon jaw, and a spring biased post associated with each jaw and engageable with one of said cam slots so that relative longitudinal movement between said cam plates and said rails causes movement of said jaws as aforesaid.

4. The combination of claim 3 wherein said timing means includes a single cam shaft extending generally parallel to the path of movement of said books, and wherein cam discs on said shaft have grooves so shaped as to cause said book carrier rails to advance books from station to station in the machine during a portion of each machine cycle in the range between one-fourth and one-third, whereby the major portion of each machine cycle is available for rounding and jointing the books at successive stations therein.

5. The combination of claim 4 wherein said books are advanced during a portion of each machine cycle in the range between 90 and 110 degrees out of the 360 degrees of crankshaft rotation corresponding to one cycle.

6. The combination of claim 4 wherein said books are advanced during a portion of each machine cycle in the range between 95 and 100 degrees out of the 360 degrees of crankshaft rotation corresponding to one cycle.

References Cited

UNITED STATES PATENTS

| | | | |
|---|---|---|---|
| 18,920 | 8/1933 | Schramm | 11—5 |
| 2,010,810 | 8/1935 | Bredenberg | 11—5 |
| 2,151,991 | 3/1939 | Schramm | 11—1 |
| 2,645,327 | 7/1953 | Hildmann | 11—1 X |
| 2,921,322 | 1/1960 | Crawley et al. | 11—1 |

LAWRENCE CHARLES, *Primary Examiner.*